(12) United States Patent
Zago et al.

(10) Patent No.: US 11,183,701 B2
(45) Date of Patent: Nov. 23, 2021

(54) FLOW BATTERY WITH MEMBRANE HAVING DIFFERENT SELECTIVITIES

(71) Applicant: Politecnico di Milano, Milan (IT)

(72) Inventors: Matteo Zago, Cantù (IT); Andrea Casalegno, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/976,519

(22) PCT Filed: Mar. 15, 2019

(86) PCT No.: PCT/IB2019/052131
§ 371 (c)(1),
(2) Date: Aug. 28, 2020

(87) PCT Pub. No.: WO2019/197917
PCT Pub. Date: Oct. 17, 2019

(65) Prior Publication Data
US 2021/0050614 A1 Feb. 18, 2021

(30) Foreign Application Priority Data

Apr. 9, 2018 (IT) .................. 102018000004325

(51) Int. Cl.
*H01M 8/18* (2006.01)
*H01M 8/0289* (2016.01)
*H01M 8/20* (2006.01)

(52) U.S. Cl.
CPC ......... *H01M 8/188* (2013.01); *H01M 8/0289* (2013.01); *H01M 8/20* (2013.01)

(58) Field of Classification Search
CPC ........ H01M 8/18; H01M 8/0289; H01M 8/20; H01M 8/188; Y02E 60/50
See application file for complete search history.

(56) References Cited

U.S. PATENT DOCUMENTS

| 6,475,661 B1 * | 11/2002 | Pellegri | H01M 8/188 |
|---|---|---|---|
| | | | 429/105 |
| 2007/0020524 A1 * | 1/2007 | Kim | H01M 4/66 |
| | | | 429/245 |

(Continued)

FOREIGN PATENT DOCUMENTS

| CN | 102237534 | * 11/2011 |
| CN | 102237534 A | 11/2011 |

(Continued)

OTHER PUBLICATIONS

CN 104716353 Absctract (Year: 2015).*
International Search Report & Written Opinion in PCT/IB2019/0521131 dated May 22, 2019.

*Primary Examiner* — Alexander Usyatinsky
(74) *Attorney, Agent, or Firm* — Manelli Selter PLLC; Edward Stemberger

(57) ABSTRACT

The flow battery comprises a first semi-cell (2), wherein a first electrolyte is fed through a first electrode (21); a second semi-cell (3), wherein a second electrolyte is fed through a second electrode (31); a partition membrane (4) disposed between the first electrode (21) and second electrode (31) in order to prevent them from reciprocally contacting with each other, and suitable to enable ions to permeate; and at least one porous barrier material layer (5) disposed between the first electrode (21) and second electrode (31), and suitable to block an undesired flow of ions of one or both the electrolytes through the partition membrane (4), the barrier material layer (5) having zones with different selectivities towards the ions whose flow is undesired.

10 Claims, 1 Drawing Sheet

(56) References Cited

U.S. PATENT DOCUMENTS

| | | | | |
|---|---|---|---|---|
| 2011/0081561 A1* | 4/2011 | Keshavarz | ............ | H01M 8/188 |
| | | | | 429/49 |
| 2011/0086247 A1* | 4/2011 | Keshavarz | .......... | H01M 4/8803 |
| | | | | 429/9 |
| 2011/0223450 A1* | 9/2011 | Horne | .................... | B60L 50/64 |
| | | | | 429/72 |
| 2013/0177789 A1* | 7/2013 | Kampanatsanyakorn | .................... | |
| | | | | H01M 8/188 |
| | | | | 429/70 |
| 2014/0030631 A1* | 1/2014 | Esswein | .................. | H01M 8/20 |
| | | | | 429/499 |
| 2014/0050999 A1* | 2/2014 | Tolmachev | ............. | H01M 8/06 |
| | | | | 429/418 |
| 2014/0255821 A1* | 9/2014 | Katayama | ............... | H01M 8/20 |
| | | | | 429/492 |
| 2016/0322662 A1* | 11/2016 | Schmitz | .............. | H01M 8/1067 |
| 2018/0048011 A1* | 2/2018 | Aziz | .................... | H01M 8/0289 |
| 2018/0053955 A1* | 2/2018 | Weber | ................ | H01M 8/1004 |
| 2020/0052310 A1* | 2/2020 | Song | .................... | H01M 8/0215 |

FOREIGN PATENT DOCUMENTS

| | | | |
|---|---|---|---|
| EP | 2750233 | * | 7/2014 |
| EP | 2750233 A1 | | 7/2014 |

\* cited by examiner

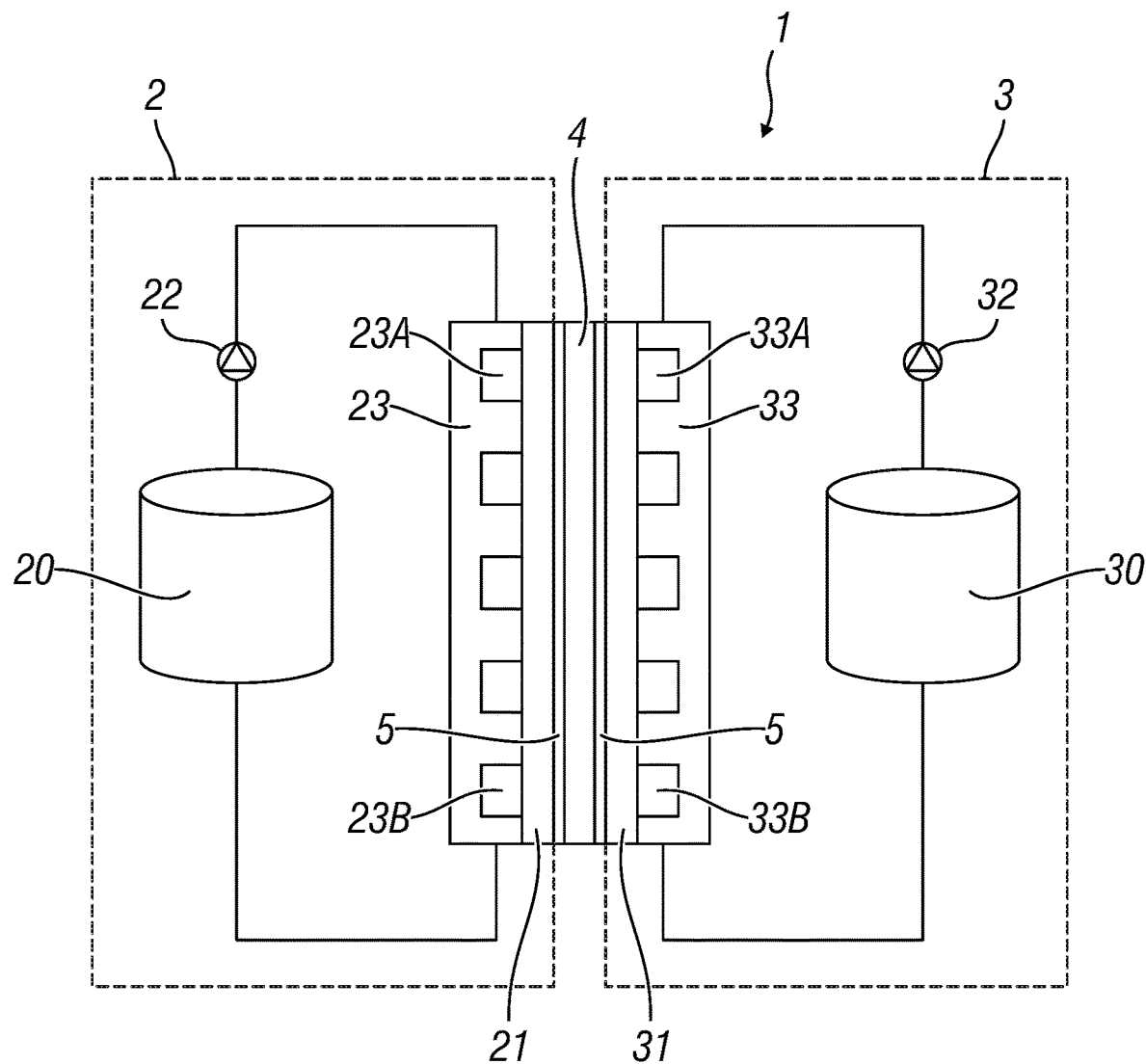

FLOW BATTERY WITH MEMBRANE HAVING DIFFERENT SELECTIVITIES

TECHNICAL FIELD OF THE INVENTION

The present invention refers to a flow battery.

PRIOR ART

A flow battery is an electrochemical cell wherein the charge and discharge processes are performed by ion oxidation and reduction reactions.

The flow batteries comprise two semi-cells, one is positive and the other is negative, each being provided with an active electrode and a distributor, through which an electrolyte is made to flow through the electrode. More particularly, the positive semi-cell is supplied by a catolyte, while the negative semi-cell is supplied by an anolyte. The catolyte and anolyte generally are acid aqueous solutions containing ions required for the corresponding redox reactions, generally metal ions under different oxidation conditions (in the following called "redox ions"), and one ion required for the charge transport in the electrolyte, which is typically hydronium $H_3O^+$ (in the following called "exchange ion").

Each semi-cell comprises at least one electrolyte tank and also a pump for supplying the electrolyte itself through the electrode. Each tank contains a predefined quantity of the electrolyte, and consequently of redox ions useful for the redox reactions for operating the flow battery.

The two semi-cells are separated by an ion exchange membrane, among this type of membranes, the most used are the proton-exchange membranes, for example the perfluorosulfonic membranes.

These membranes, even though they have an optimal proton conductivity and a good resistance to an oxidizing environment, have the disadvantage of being scarcely selective towards the redox ions present in electrolytes, which consequently can permeate through the membrane, mix with each other and possibly also react.

Such phenomenon also known as cross-over, to which a complex water transporting mechanism controlled by the diffusion and electroosmosis is added, entails undesired changes of amount and/or composition of the electrolytes in the corresponding tanks (known as unbalance), consequently the useful capacity of the battery is decreased. The cross-over implies also a decrease of the flow battery coulombic efficiency. In addition, the effects of the cross-over have a different intensity according to the permeated redox ion.

Indeed, the redox ions present in the electrolytes have different oxidation states, and some of them are more detrimental to the unbalance and coulombic efficiency, than other ions. For example, with reference to the vanadium batteries, the anolyte contains the pair $V^{2+}/V^{3+}$, and the catolyte contains the pair $VO_2^+/VO^{2+}$. The most detrimental ion at the negative electrode is $VO_2^+$, since it reacts with two ions $V^{2+}$ (which is the ion required to the operation of the battery during the discharge step at the negative electrode). On the contrary, at the positive electrode, the ion $V^{2+}$ is more detrimental since it reacts with two ions $VO_2^+$ (while $V^{3+}$ reacts with only one ion $VO_2^+$). In other words, in the vanadium batteries, the permeation of the ions $V^{2+}$ and $VO_2^+$ is more problematic than the permeation of the ions $V^{3+}$ and $VO^{2+}$.

A first solution to the cross-over problem consisted of increasing the thickness of the ion exchange membranes, for example from about 50 µm to about 200 µm.

Even though a reduction of the cross-over is obtained, this approach is not completely satisfying because it implies an increase of the ohmic losses. An excessive increase of the thickness of the membrane requires to decrease the operative current density, for ensuring the required energy efficiency value, which generally is greater than 80%. A smaller current density entails the use of a greater active area in the battery, consequently increasing the system costs.

Document US 2014/255821 discloses a membrane for a flow battery, on which an additional porous membrane is applied having a thickness not greater than 500 µm, wherein the pores thereof have a size not greater than 100 nm. Such additional porous membrane has the object of reducing the redox ions passage through the membrane, by exploiting the dimension of the pores, comparable to the size of the redox ions to be blocked, and greater than the size of the exchange ion. For example, with reference to the vanadium flow battery, the pores can have dimensions less than 30 nm.

Also this approach presents some limitations. The pores having a size on the order of ten nanometers, even though they ensure a greater selectivity towards the redox ions of the electrolytes, they cause a partial inhibition of the hydronium passage, so increasing the ohmic losses of the flow battery.

Another problem of the additional membrane consists of having homogeneous properties, and particularly a homogeneous capability of blocking the ions on all the surface thereof, while the ions concentration to be blocked is inhomogeneous across the same surface. Therefore, the additional membrane reduces the cross-over of the ions with the same intensity on all the active surface and consequently increases the ohmic losses.

BRIEF SUMMARY OF THE INVENTION

Therefore, it is the object of the present invention to provide a flow battery having a good compromise between the selectivity towards the redox ions of the electrolytes, and a good ionic conductivity through the membrane.

This and other objects are met by a flow battery according to claim 1.

The dependent claims define possible advantageous embodiments of the invention.

The idea underlying the invention consists of providing one or more layers of a barrier material having a varying selectivity towards the ions of which the flow is undesired.

BRIEF DESCRIPTION OF THE DRAWINGS

In order to better comprehend the invention and appreciate the advantages thereof, some exemplifying non-limiting embodiments thereof will be described in the following with reference to the attached figure, illustrating a flow battery according to a possible embodiment of the invention.

DESCRIPTION OF SOME EMBODIMENTS OF THE INVENTION

A flow battery, according to the invention, is indicated in the attached figure with the reference 1. Generally, the flow battery 1 comprises:

a first semi-cell 2, comprising at least one first tank 20 for a first electrolyte, a first electrode 21 connected to the first tank 20, a first feed member 22 for feeding the first electrolyte through the first electrode 21;

a second semi-cell 3, comprising at least one second tank 30 for a second electrolyte, a second electrode 31 connected to the second tank 30 and a second feed member 32 for feeding the second electrolyte through the second electrode 31.

Obviously, one of the semi-cells is a negative semi-cell, and the other one is positive. In the illustrated example, the first semi-cell 2 is negative and the second semi-cell 3 is positive. Consequently, the first electrolyte is an anolyte, while the second electrolyte is a catolyte.

As it is already known by a person skilled in the field, the electrodes 21, 31 have usually the shape of a sheet, in other words a flat shape extended in a plane. Therefore, the reaction surface with the electrolyte is increased. According to the used distributor geometry, the thickness of the electrodes is generally comprised between 0.2 and 6 mm.

Preferably, the first and second semi-cells 2, 3 respectively comprise a first and second distributors 23, 33 connected at the output of the feed member 22, and fixed to the electrode 21, 31 in order to contact a surface thereof (FIG. 1). The distributor 23, 33 is for distributing the electrolyte on all the useful surface of the electrode 21, 31 so that the maximum amount of the electrolyte on the electrode is made to react.

For this purpose, the distributor 23, 33 comprises a predefined path on the surface thereof which comes in contact with the electrode 21, 31 and through which the electrolyte is fed. Such path can consist of one or more serpentines, or of interdigitated or parallel channels, for example. The distributor 23, 33 comprises also an inlet 23A, 33A and an outlet 23B, 33B for the electrolyte.

Typically, the feed member 22, 32 is a conventional type pump member.

The flow battery 1 also comprises a partition membrane 4 disposed between the first electrode 21 and second electrode 31 in order to prevent them from contacting each other. The partition membrane 4 is suitable to enable the ions permeation, particularly of an exchange ion between the first semi-cell 2 and second semi-cell 3.

Analogously to the electrodes 21, 31, the membrane 4 is also in the shape of a sheet in order to physically separate the electrodes 21, 31 on all the surface thereof.

Preferably, the membrane 4 is an ion exchange membrane, still more preferably a proton exchange membrane, for example a perfluorosulfonic membrane, in this case, the exchange ion is the hydronium $H_3O^+$. Typically, the partition membrane 4 is porous, and has pores having a dimension (diameter) on the order of nanometers, for example comprised between 5 and 20 nm. The thickness of the partition membrane 4 is typically comprised between 50 and 200 µm but can be also more according to the requirements.

The flow battery 1 comprises also at least one porous barrier material layer 5 disposed between the first electrode 21 and second electrode 31 and suitable to block an undesired flow of ions of one or both electrolytes through the partition membrane 4. The term "undesired flow of ions" means, in the context of the present invention, a flow of ions useful for the operation of the battery, from a first semi-cell (wherein such ions enable the normal operation of the battery) towards the second semi-cell (wherein the same ions contribute to the unbalance and to decrease the coulombic efficiency of the battery). More specifically, the undesired flow of ions is the flow of ions reacting at the electrodes. For the sake of simplicity, such ions will be defined as redox ions in the following of this patent application. An example of redox ions are the metal ions contained in some known electrolytes.

Since the flow of exchange ion (e.g. the hydronium) through the membrane 4 is necessary to a good operation of the battery, it is obvious for a person skilled in the art such flow being not an undesired flow of ions.

The barrier material layer 5 has at least one surface contacting the partition membrane 4. It is in the shape of a sheet, as the previously described electrodes 21, 31 and partition membrane 4. The average thickness of the barrier material layer 5 is in the order of microns, for example from 0.5 to 10 µm according to the requirements, and has pores the average dimension (diameter) of which is in the order of nanometers, for example from 1 to 5 nm.

Preferably, the battery 1 comprises two barrier material layers 5. More preferably, each barrier material layer 5 is in contact with the partition membrane 4 and with a corresponding electrode 21, 31 (as shown in FIG. 1). In this case, the barrier material layers 5 have only one surface in contact with the membrane 4.

It is possible to provide only one barrier material layer disposed inside the membrane 4, or also two barrier material layers disposed inside the membrane 4. In this case, the barrier material layer has two surfaces in contact with the membrane 4. However, such solutions are less preferable than the one shown in FIG. 1, since they are more complex and have higher manufacturing costs.

According to the present invention, the barrier material layer 5 has zones having different selectivities towards the ions whose flow is undesired. In other words, the barrier material layer 5 has an ion selectivity (towards the redox ions) which is inhomogeneous.

The term "selectivity towards the ions" means, in the context of the present invention, the capability of blocking ions.

Since there are zones having different selectivities towards the redox ions, it is possible to modulate such selectivity according to the type and concentration of the ions to be blocked at one corresponding zone of the barrier material layer.

This selectivity modulation enables to increase the selectivity where the redox ions concentration is greater, particularly with reference to the more damaging redox ions, in other words the ones which lead to a greater unbalance and a higher reduction of the coulombic efficiency (the ions $V^{2+}$ and $VO_2^+$ with reference to the vanadium batteries, for example), and to reduce this selectivity where the concentration of such ions is less. Indeed, it is known that the redox ions concentration is heterogeneous both on the active surface of the electrodes, and through the thickness thereof.

A decrease of the selectivity where the concentration of the redox ions is less, restrains the ohmic losses due to a partial block of the exchange ion, without enabling the redox ions to permeate. Consequently, the modulation of the selectivity of the barrier material layer enables to effectively block the redox ions while restraining the ohmic losses.

By way of example, it is observed that in the vanadium flow batteries, during the discharge step, the concentration of the ions $VO_2^+$ at the positive electrode 31 is greater at the inlet 33A of the distributor 33, if this latter has a single serpentine path. In this case, it is appropriate to increase the selectivity of the barrier material layer 5 regarding the positive electrode 31 at the inlet 33A of the distributor 33.

On the contrary, if the distributor 33 has a path with interdigitated channels, the concentration of the ions $VO_2^+$ is greater in the feed channels. In this case, the selectivity of the barrier material layer 5 must be increased at these zones.

Another advantage of such barrier material layer 5 is that it makes it possible to reduce the thickness of the partition membrane 4, and consequently to decrease also its cost, which, in the flow batteries, can be up to 40% of the overall cost. The ions exchange partition membrane 4 can be also eliminated by the system and replaced with a (non-ion exchange) membrane or with a low cost separator.

So that, for the same ohmic losses, a flow battery provided with barriers enables an operation with a reduced cross-over, simultaneously ensuring a greater coulombic efficiency and a reduced unbalance.

The selectivity of the barrier material layer 5 can depend on one or more factors between the dimension (average diameter) of the pores, the tortuousness of the path to be followed by the ions, the thickness or the chemical composition of the barrier material layer. Indeed, the smaller the pores are, the more the redox ions are blocked. In the same way, the more tortuous the path to be followed to cross the barrier material layer is, or also the more this layer is thick, the more the redox ions passage is blocked.

Therefore, it is understood that the barrier material layer 5 has at least one first zone having a first selectivity towards the ions, and at least one second zone having a second selectivity towards the ions, the first selectivity being greater than the second selectivity.

According to a possible variant, the dimension of the pores of the first zone (having the first selectivity) is comprised between 1 and 2 nm, while the dimension of the pores of the second zone (having the second selectivity smaller than the first selectivity) is comprised between 3 and 5 nm.

According to another possible variant, the thickness of the first zone is comprised between 5 and 10 μm, while the thickness of the second zone is comprised between 0.5 and 5 μm.

According to another variant of the invention, the barrier material layer 5 is made of an electrochemically inert material, which can be still suitably workable and is resistant to the weather conditions. Such inert material is for example selected among the polymers, zeolites and metal oxides. Obviously, other electrochemically inert materials can be used for making the barrier material layer.

According to still another variant, the barrier material layer 5 is at least partially made of an electrochemically active material. An example of an active material to be included in the barrier material layer 5 is carbon, however other active materials can be used.

The term "electrochemical activity" means, in the context of the present invention, the capability of a given material to be subjected to a voltage variation so as to cause an electrochemical reaction with an electrolyte (more specifically an electron transfer from or towards a metal ion present in the electrolyte). It is understood that an inert material cannot cause an electrochemical reaction, while an active material can cause an electrochemical reaction.

It is noted the possibility of having a barrier material layer consisting only of an electrochemically active material. However, it is preferable that such layer consists of both an active material and inert material, in order to obtain a stronger layer.

According to a possible embodiment, the barrier material layer 5, which is at least partially composed by an electrochemically active material, is applied on at least one of the electrodes 21, 31. In this way, the electrode 21, 31 (comprising the integrated barrier material layer) has a thickness in the order of some hundreds of micrometers, for example from 200 to 500 μm.

It is noted that when the barrier material layer 5 is at least partially made of an electrochemically active material, the same material can be provided with a homogeneous selectivity towards the redox ions, in other words with a single selectivity on all the surface thereof. However, such variant is not comprised in the scope of the present invention.

More preferably, the barrier material layer 5 is applied to the partition membrane 4 or to an electrode 21, 31 by spraying.

In this way, the application is easy and quick to be made. Moreover, spraying enables to have a good control on the thickness of the barrier material layer 5, which in turn enables to change the thickness thereof according to the requirement, and consequently to obtain a locally optimized selectivity.

Obviously, it is possible to provide other ways of applying the barrier material layer 5 on the partition membrane 4 or on the electrodes 21, 31, for example by known methods, e.g. vapor deposition or tape casting.

A person skilled in the art in order to meet specific contingent needs to the described embodiments of the flow battery according to the invention, can introduce several additions, modifications, or substitutions of elements with other operatively equivalent ones, without falling out of the scope of the attached claims.

The invention claimed is:

1. Flow battery comprising:
   a first semi-cell comprising at least one first tank for a first electrolyte, a first electrode connected to said first tank, a first feed member for feeding the first electrolyte through said first electrode;
   a second semi-cell comprising at least one second tank for a second electrolyte, a second electrode connected to said second tank and a second feed member for feeding the second electrolyte through said second electrode;
   a partition membrane disposed between the first electrode and second electrode so as to prevent them to reciprocally contact each other, said partition membrane being suitable to enable the ion permeation;
   at least one porous barrier material layer disposed between the first electrode and second electrode, and suitable to block an undesired flow of ions of one or both the electrolytes through the partition membrane, said barrier material layer having at least one contact surface with the partition membrane;
   wherein said barrier material layer has areas with different selectivities to ions of which the flow is undesired.

2. Flow battery according to claim 1, comprising two barrier material layers.

3. Flow battery according to claim 2, wherein each of the barrier material layers is in contact with the partition membrane and a respective electrode.

4. Flow battery according to claim 1, wherein the ion selectivity is determined by one or more among the thickness of the barrier material layer, the tortuousness of the path to be followed for passing through the barrier material layer, the size of the pores of the barrier material, or the chemical composition of the barrier material.

5. Flow battery according to claim 1, wherein the barrier material layer has at least one first area having a first ion selectivity, and at least one second area having a second ion selectivity, the first selectivity being greater than the second selectivity.

6. Flow battery according to claim 5, wherein the first area has pores which are in a size comprised between 1 and 2 mm, while the second area having the second selectivity smaller than the first selectivity, has pores which are in a size comprised between 3 and 5 nm.

7. Flow battery according to claim 5, wherein the first area has a thickness comprised between 5 and 10 μm, while the second area has a thickness comprised between 0.5 and 5 μm.

8. Flow battery according to claim 1, wherein the barrier material layer is applied on the partition membrane or on an electrode by spraying.

9. Flow battery according to claim 1, wherein the barrier material layer is made at least partially of an electrochemically active material.

10. Flow battery according to claim 1, wherein the barrier material layer is applied on at least one of the electrodes.

\* \* \* \* \*